US009595401B1

(12) United States Patent
Lee et al.

(10) Patent No.: US 9,595,401 B1
(45) Date of Patent: Mar. 14, 2017

(54) METHOD OF FABRICATING GRAPHENE NANO-MESH (71) Applicant: Samsung Electronics Co., Ltd., Suwon-si, Gyeonggi-do (KR)

(72) Inventors: Jooho Lee, Hwaseong-si (KR); Yongsung Kim, Suwon-si (KR); Changseung Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/066,780

(22) Filed: Mar. 10, 2016

(30) Foreign Application Priority Data

Sep. 3, 2015 (KR) .................. 10-2015-0124949

(51) Int. Cl.
*H01G 4/00* (2006.01)
*H01G 5/00* (2006.01)
*H01G 7/00* (2006.01)
*H01G 9/00* (2006.01)
*H01G 13/00* (2013.01)
*H01G 11/86* (2013.01)
*H01G 11/36* (2013.01)
*C23C 16/26* (2006.01)
*C23C 16/40* (2006.01)
*C23C 16/455* (2006.01)
*C23C 16/50* (2006.01)

(52) U.S. Cl.
CPC ............. *H01G 11/86* (2013.01); *C23C 16/26* (2013.01); *C23C 16/40* (2013.01); *C23C 16/45525* (2013.01); *C23C 16/50* (2013.01); *H01G 11/36* (2013.01)

(58) Field of Classification Search
CPC .................................... H01L 21/67075
USPC ................................. 216/6; 977/847
See application file for complete search history.

(56) References Cited

U.S. PATENT DOCUMENTS

2014/0141581 A1 5/2014 Sato et al.
2014/0205796 A1* 7/2014 Afzali-Ardakani .... B82Y 40/00
428/131

FOREIGN PATENT DOCUMENTS

KR 20120022164 A 3/2012
KR 10-2013-0050168 A 5/2013

OTHER PUBLICATIONS

Kim, K. et al., "Selective metal deposition at graphene line defects by atomic layer deposition," Nature Communications Journal, vol. 5, No. 4781, 2014, pp. 1-18.

(Continued)

*Primary Examiner* — Roberts Culbert
(74) *Attorney, Agent, or Firm* — Harness, Dickey & Pierce, P.L.C.

(57) ABSTRACT

Example embodiments relate to a method of fabricating a graphene nano-mesh by selectively growing an oxide layer on a defect site of a graphene layer and etching the oxide layer to form the graphene nano-mesh. The method includes forming a graphene layer on a catalyst layer, forming an oxide layer on a defect site of the graphene layer, forming the graphene nano-mesh including a plurality of openings by etching the oxide layer, and transferring, after removing the catalyst layer, the graphene nano-mesh onto a substrate.

18 Claims, 6 Drawing Sheets (56) References Cited

OTHER PUBLICATIONS

Bjelkevig, C. et al., "Electronic structure of a graphene/hexagonal-BN heterostructure grown on Ru (0001) by chemical vapor deposition and atomic layer deposition: extrinsically doped graphene," Journal of Physics: Condensed Matter, vol. 22, No. 30, 2010, pp. 1-17.

Mills, E. et al., "Silicon nanopillar anodes for lithium-ion batteries using nanoimprint lithography with flexible molds," Journal of Vacuum Science & Technology B 32(6), 2014, pp. 1-6.

Liu, J., et al., "Doped graphene nanohole arrays for flexiblle transparent conductors," American Institute of Physics, Applied Physics Letters, vol. 99, 2011, pp. 023111-1-023111-3.

* cited by examiner

METHOD OF FABRICATING GRAPHENE NANO-MESH

CROSS-REFERENCE TO RELATED APPLICATION

This application claims the benefit of priority from Korean Patent Application No. 10-2015-0124949, filed on Sep. 3, 2015, in the Korean Intellectual Property Office, the disclosure of which is incorporated herein in its entirety by reference.

BACKGROUND

1. Field

Example embodiments relate to a method of fabricating a graphene nano-mesh, and more particularly, to a method of fabricating a graphene nano-mesh via atomic layer deposition on a graphene layer to thus perform a selective deposition of an oxide layer and removal of the oxide layer.

2. Description of the Related Art

Graphene is a 2-dimensional thin film formed as a monolayer of carbon atoms in a honeycomb structure. When carbon atoms are chemically combined by $sp^2$ orbital hybridization, the carbon atoms form a 2-dimensional carbon hexagonal lattice plane. Graphene is a group of carbon atoms with such planar structure. A layer of graphene has a thickness of about 0.34 nm, which corresponds to a single atom only. Graphene has high structural and chemical stability. Also, graphene is a good conductor because graphene has a charge transportability that is about 100 times faster than the charge transportability of silicon, and also may allow about 100 times greater amount of current flow than copper. In addition, graphene has good transparency, and may have a higher transparency than indium tin oxide (ITO), which is typically used as a transparent electrode in the related art. Much research has been conducted to apply graphene to electronic devices in view of the characteristics of graphene above.

In order to use a graphene thin film in a battery or a transparent display device, a graphene thin film may be manufactured in the form of a nano-mesh. A well-known method in this regard includes removing graphene from a layer using plasma after a photolithography process, and subsequently removing a polymer such as a photoresist from the graphene. Also, using nanoimprinting by utilizing stamps so as to fabricate a nano-mesh after transferring graphene on a layer is well known.

SUMMARY

Example embodiments relate to a method of fabricating a graphene nano-mesh by forming an oxide layer via atomic layer deposition on a defect site of a graphene layer, and removing the oxide layer.

Additional example embodiments will be set forth in part in the description which follows and, in part, will be apparent from the description, or may be learned by practice of the example embodiments.

According to an example embodiment, a method of fabricating a graphene nano-mesh includes forming a graphene layer on a catalyst layer, forming an oxide layer on a defect site of the graphene layer, forming a graphene nano-mesh including a plurality of openings by etching the oxide layer, and transferring, after removing the catalyst layer, the graphene nano-mesh onto a substrate.

The method may further include, after forming the graphene nano-mesh including the plurality of openings, forming a cover film on the graphene nano-mesh.

The forming of the graphene layer may include forming the graphene layer via chemical vapor deposition.

The chemical vapor deposition may include plasma enhanced chemical vapor deposition.

The forming of the oxide layer may include forming the oxide layer via atomic layer deposition.

The oxide layer may include at least one of $Al_2O_3$, HfOx, $TiO_2$, $SiO_2$, and ZnO.

The method may further include, after forming the graphene nano-mesh including the plurality of openings, chemically doping the graphene nano-mesh.

The substrate may be a flexible transparent substrate.

The transferring of the graphene nano-mesh onto the substrate may include stacking the graphene nano-mesh on the substrate a plurality of times.

According to an example embodiment, a method of fabricating a graphene nano-mesh includes forming a graphene layer on a catalyst layer, forming an oxide layer on a defect site of the graphene layer, removing the catalyst layer, transferring the graphene layer and the oxide layer onto a substrate, and forming a graphene nano-mesh including a plurality of openings by etching the oxide layer.

The method may further include, after forming the oxide layer, forming a cover film on the graphene layer and the oxide layer.

The forming of the graphene layer may include forming the graphene layer via chemical vapor deposition.

The chemical vapor deposition may include plasma enhanced chemical vapor deposition.

The forming of the oxide layer may include forming the oxide layer via atomic layer deposition.

The oxide layer may include at least one selected from $Al_2O_3$, HfOx, $TiO_2$, $SiO_2$, and ZnO.

The method may further include, after forming the graphene nano-mesh including the plurality of openings, chemically doping the graphene nano-mesh.

According to an example embodiment, a method of fabricating a super capacitor includes forming a graphene layer on a catalyst layer, forming an oxide layer on a defect site of the graphene layer, removing the catalyst layer, and transferring the graphene layer and the oxide layer onto a substrate by stacking the graphene layer and the oxide layer on the substrate a plurality of times.

The oxide layer may include at least one of $Al_2O_3$, $HfO_x$, $TiO_2$, $SiO_2$, and ZnO.

BRIEF DESCRIPTION OF THE DRAWINGS

These and/or other example embodiments will become apparent and more readily appreciated from the following description, taken in conjunction with the accompanying drawings in which.

DETAILED DESCRIPTION

Hereinafter, one or more example embodiments will now be described with reference to the accompanying drawings so that this disclosure will be thorough and complete, and will convey the inventive concepts to one of ordinary skill in the art. The inventive concepts may, however, be embodied in many different forms and should not be construed as being limited to the embodiments set forth herein. Features that are unnecessary for clearly describing the inventive concepts are not included in the drawings. Also, throughout the specification, like reference numerals in the drawings denote like elements. Expressions such as "at least one of," when preceding a list of elements, modify the entire list of elements and do not modify the individual elements of the list.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

Throughout the specification, when a portion "includes" an element, another element may be further included, rather than excluding the existence of the other element, unless otherwise described.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

FIGS. 1A to 1F are cross-sectional views for sequentially describing a method of fabricating a graphene nano-mesh according to an example embodiment.

Figure 1A:
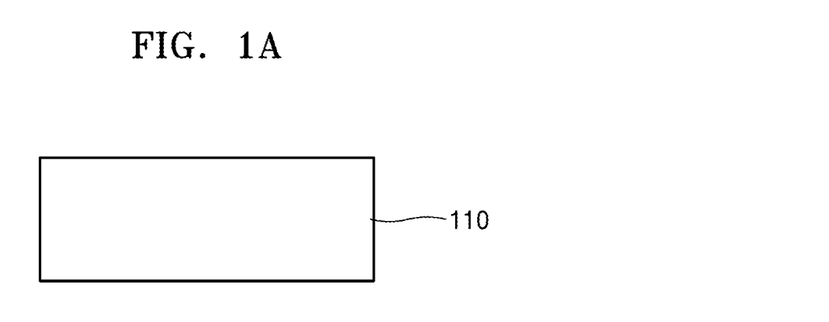
FIGS. 1A to 1F are cross-sectional views for sequentially describing a method of fabricating a graphene nano-mesh according to an example embodiment.

Referring to FIG. 1A, first, a catalyst is prepared. The catalyst layer 110 functions as a catalyst for growing graphene thereon and may be formed of or include a metallic material. The catalyst layer 110 may be of a sheet type, a substrate type, or a rolled film type layer. The catalyst layer 110 may include, but is not limited to, at least one of copper (Cu), nickel (Ni), cobalt (Co), iron (Fe), platinum (Pt), gold (Au), silver (Ag), aluminum (Al), chrome (Cr), magnesium (Mg), manganese (Mn), molybdenum (Mo), rhodium (Rh), silicon (Si), tantalum (Ta), titanium (Ti), tungsten (W), uranium (U), vanadium (V), palladium (Pd), yttrium (Y), zirconium (Zr), germanium (Ge), brass, bronze, white brass, stainless steel, and an alloy thereof.

Figure 1B:
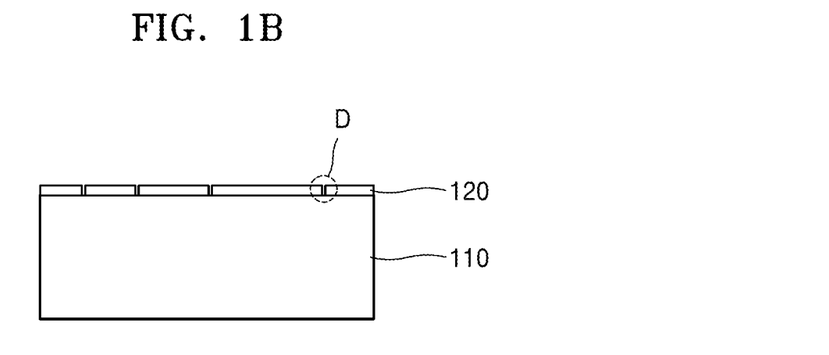

Second, referring to FIG. 1B, a graphene layer 120 is formed on the catalyst layer 110. Various methods may be used to form the graphene layer 120, for example, chemical vapor deposition (CVD), thermal chemical vapor deposition (TCVD), rapid thermal chemical vapor deposition (RTCVD), plasma enhanced chemical vapor deposition (PECVD), inductive coupled plasma chemical vapor deposition (ICP-CVD), and atomic layer deposition (ALD). A gaseous carbon source may include at least one of carbon atoms, methane ($CH_4$), carbon monoxide (CO), ethane ($C_2H_6$), ethylene ($CH_2$), ethanol ($C_2H_5$), acetylene ($C_2H_2$), propane ($CH_3CH_2CH_3$), propylene ($C_3H_6$), butane ($C_4H_{10}$), pentane ($CH_3(CH_2)_3CH_3$), pentene ($C_5H_{10}$), cyclopentadiene ($C_5H_6$), hexane ($C_6H_{14}$), cyclohexane ($C_6H_{12}$), benzene ($C_6H_6$), and toluene ($C_7H_8$). The gaseous carbon source is separated into carbon atoms and hydrogen atoms at a high temperature. The separated carbon atoms are deposited on the catalyst layer 110 that is heated, and the graphene layer 120 is formed as the catalyst layer 110 cools.

The graphene layer 120 may include a defect site D. The graphene layer 120 grown via CVD may include a plurality of defect sites D. In particular, the graphene layer 120 grown via PECVD may include a relatively large number of defect sites D.

Figure 1C:
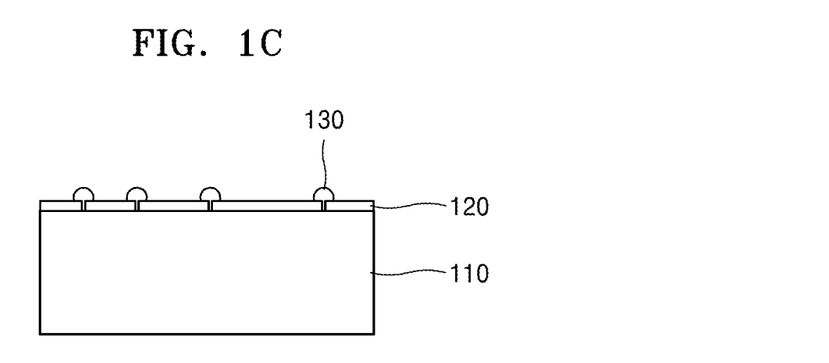

Third, referring to FIG. 1C, an oxide layer 130 is formed on the graphene layer 120. The oxide layer 130 may be formed using ALD. In order to form a thin film via atomic layer deposition, a substrate may include a portion able to adsorb a reactant material. If the substrate has no portion for adsorption, a thin film may typically not be formed via ALD. Referring to FIG. 1B, the plurality of defect sites D are on the graphene layer 120, and a reactant may be adsorbed on the defect sites D. Therefore, the oxide layer 130 may be selectively formed on the defect sites D by using ALD. As a result, the oxide layer 130 may be formed as an island on the graphene layer 120. Also, the oxide layer 130 may include $Al_2O_3$, HfOx, $TiO_2$, $SiO_2$, or ZnO.

Figure 1D:
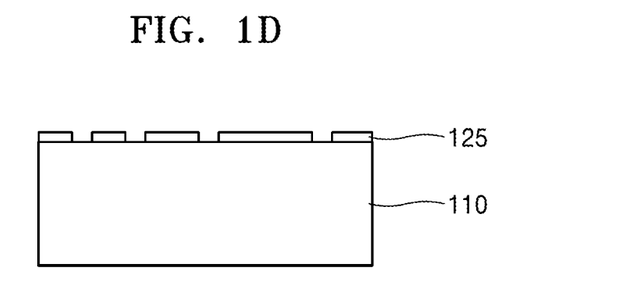

Fourth, referring to FIG. 1D, the oxide layer 130 of FIG. 1C is removed by etching. When the oxide layer 130 is removed, a portion of the graphene layer 120 corresponding to the defect site D to which the oxide layer 130 is adsorbed may also be removed. Accordingly, a graphene nano-mesh 125 with a plurality of holes corresponding to the removed portions 120 and the removed oxide layer 130 may be formed.

Since the graphene nano-mesh 125 is formed by partially removing graphene from the graphene layer 120, the graphene nano-mesh 125 may have a lower electrical conductivity than the graphene layer 120. That is, a surface resistance of the graphene nano-mesh 125 may be greater than the surface resistance of the graphene layer 120. The graphene nano-mesh 125 may be doped to decrease the surface resistance thereof. Doping may be performed by dry doping or wet doping. Accordingly, the electric characteristics of the graphene nano-mesh 125 may be improved.

Figure 1E:
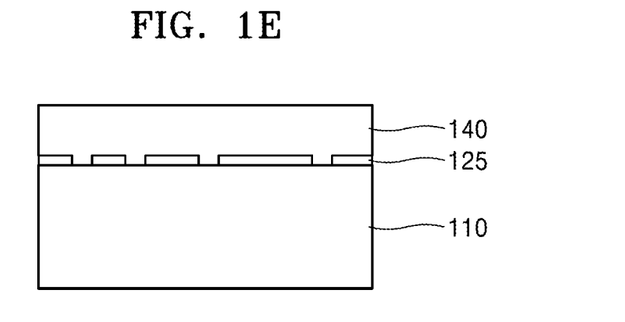

Fifth, referring to FIG. 1E, a cover film 140 is attached to the graphene nano-mesh 125. The cover film 140 may protect the graphene nano-mesh 125 from external materials.

Figure 1F:
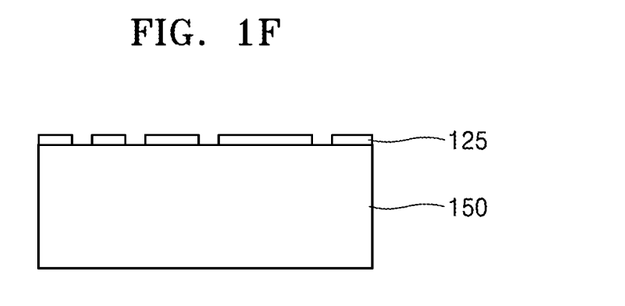

Sixth, referring to FIG. 1F, the catalyst layer 110 is removed, and the graphene nano-mesh 125 is transferred onto a substrate 150. The catalyst layer 110 may be removed by, for example, wet etching. However, a method of removing the catalyst layer 110 is not limited thereto. A dry etching process, for example, etching or polishing a surface of the catalyst layer 110 by using plasma, may be additionally performed before performing the wet etching process, thereby decreasing the time necessary for removing the catalyst layer 110. Examples of an etchant that is used to wet-etch the catalyst layer 110 may include one of ammonium persulfate (($NH_4)_2S_2O_8$), hydrogen fluoride (HF), buffered oxide etch (BOE), iron(III) chloride ($FeCl_3$), iron nitrate ($Fe(No_3)_3$), copper(II) chloride ($CuCl_2$), hydrogen peroxide ($H_2O_2$), sulfuric acid ($H_2SO_4$), and sodium persulfate ($Na_2S_2O_8$). However, the examples of the etchant are not limited thereto. Alternatively, a hydrogen peroxide-based solution consisting of $H_2O_2$, $H_2SO_4$, and water ($H_2O$) may be used. After the catalyst layer 110 is removed, a process of cleaning and drying the remaining etchant may be further included.

After the catalyst layer 110 is removed, the graphene nano-mesh 125 may be transferred onto the substrate 150, and the cover film 140 may be removed. The substrate 150 indicates a component on which the graphene nano-mesh 125 may be formed. The substrate 150 may be a flexible substrate that includes a flexible material, for example, polymer. For example, the substrate 150 may include, but is not limited to, polyethylene naphthalate (PEN), polyethylene terephthalate (PET), polycarbonate, polyvinyl alcohol, polyacrylate, polyimide, polynorbornene, or polyethersulfone (PES). The substrate 150 coated with the graphene nano-mesh 125 may be used as, for example, a transparent electrode film of a flexible display, an organic light-emitting device (OLED), a solar battery, and the like.

When the cover film 140 is a thermal release tape, heat caused by a thermal release temperature or above may be applied to the thermal release tape to reduce adhesion strength of the thermal release tape. Then, a desired, or alternatively predetermined amount of force may be applied to separate the cover film 140 from the graphene nano-mesh 125. When the cover film 140 is a polymer supporter, an organic solvent such as acetone may be applied to melt and remove the cover film 140.

Based on the example method of fabricating the graphene nano-mesh 125 according to an example embodiment, fabrication steps and fabrication time may be reduced because there is no additional photolithography process. Also, since no polymer is used as a photoresist, no polymer remains on a surface of graphene, and thus, electric characteristics of the graphene nano-mesh 125 may be substantially prevented from declining.

Figure 2:
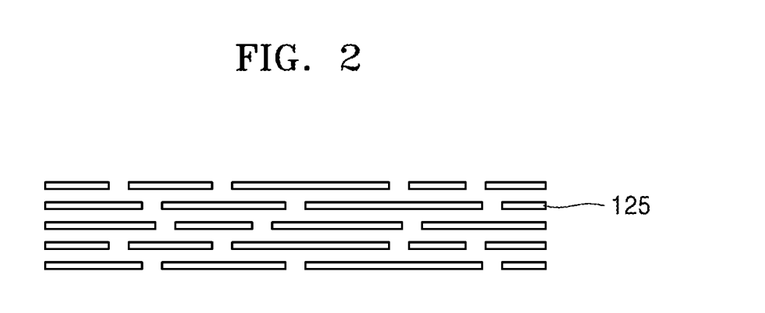
FIG. 2 is a cross-sectional view schematically illustrating a super capacitor formed by using the graphene nano-mesh that is fabricated according to the example embodiment of FIGS. 1A to 1F.

FIG. 2 is a cross-sectional view schematically illustrating a super capacitor formed by using the graphene nano-mesh 125 fabricated according to the example embodiment of FIGS. 1A to 1F.

Referring to FIG. 2, when the graphene nano-mesh 125 is transferred onto a substrate, a plurality of graphene nano-mesh layers 125 are stacked and transferred. In the stacked graphene nano-mesh 125, an effective area for storing electricity increases in the graphene nano-mesh 125. The stacked graphene nano-mesh 125 may be used as a super capacitor.

FIGS. 3A to 3F are cross-sectional views for sequentially describing a method of fabricating a graphene nano-mesh 225 according to another example embodiment.

Figure 3A:
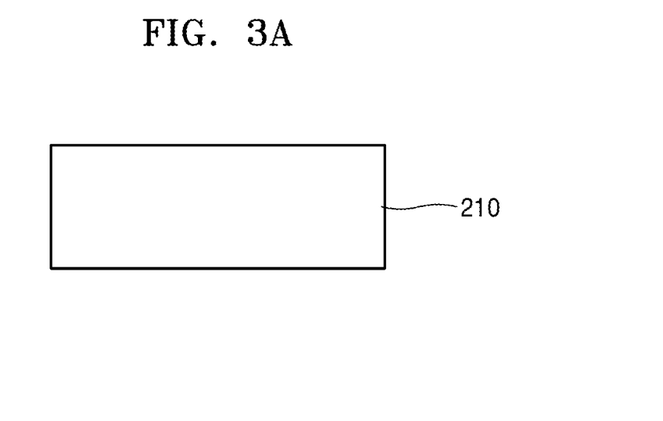
FIGS. 3A to 3F are cross-sectional views for sequentially describing a method of fabricating a graphene nano-mesh according to another example embodiment.

Referring to FIG. 3A, first, a catalyst layer 210 is prepared. The catalyst layer 210 functions as a catalyst for growing graphene and may be formed by using a metallic material. The catalyst layer 210 may be a sheet type, a substrate type, or a rolled film type layer. The catalyst layer 210 may include, but is not limited to, at least one of Cu, Ni, Co, Fe, Pt, Au, Ag, Al, Cr, Mg, Mn, Mo, Rh, Si, Ta, Ti, W, U, V, Pd, Y, Zr, Ge, brass, bronze, white brass, stainless steel, and an alloy thereof.

Figure 3B:
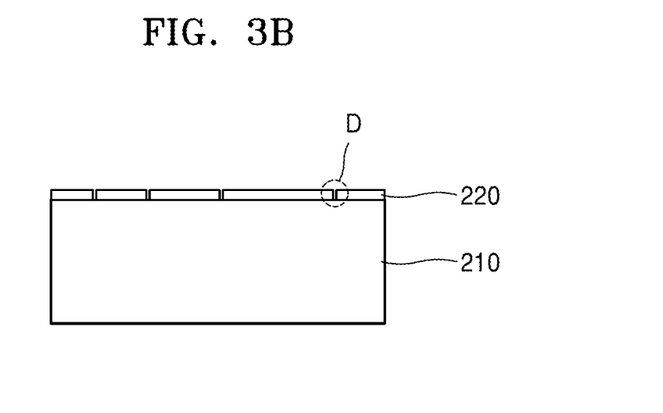

Second, referring to FIG. 3B, a graphene layer 220 is formed on the catalyst layer 210. Various methods may be used to form the graphene layer 220, for example, CVD, TCVD, RTCVD, PECVD, ICP-CVD, and ALD. A gaseous carbon source may include at least one of carbon atoms, methane ($CH_4$), carbon monoxide (CO), ethane ($C_2H_6$), ethylene ($CH_2$), ethanol ($C_2H_5$), acetylene ($C_2H_2$), propane ($CH_3CH_2CH_3$), propylene ($C_3H_6$), butane ($C_4H_{10}$), pentane ($CH_3(CH_2)_3CH_3$), pentene ($C_5H_{10}$), cyclopentadiene ($C_5H_6$), hexane ($C_6H_{14}$), cyclohexane ($C_6H_{12}$), benzene ($C_6H_6$), and toluene ($C_7H_8$). The gaseous carbon source is separated into carbon atoms and hydrogen atoms at a high temperature. The separated carbon atoms are deposited on the catalyst layer 210 that is heated, and the graphene layer 220 is formed as the catalyst layer 210 cools.

The graphene layer 220 may include a defect site D. The graphene layer 220 that is grown via CVD may include a plurality of defect sites D. In particular, the graphene layer 220 that is grown via, for example, PECVD, may include a relatively large number of defect sites D.

Figure 3C:
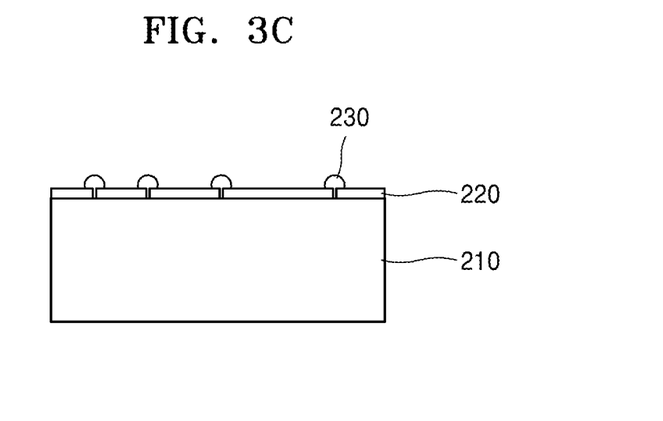

Third, referring to FIG. 3C, an oxide layer 230 is formed on the graphene layer 220. The oxide layer 230 may be formed by using ALD. In order to form a thin film via atomic layer deposition, a substrate has to include a portion for adsorbing a reactant material. If the substrate has no portion for adsorption, a thin film cannot be formed via ALD. Referring to FIG. 3B, the plurality of defect sites D are on the graphene layer 220, and a reactant may be adsorbed to the defect sites D. Therefore, the oxide layer 230 may be selectively formed on the defect sites D by using ALD. As a result, the oxide layer 230 may be formed as an island on the graphene layer 220. Also, the oxide layer 230 may include at least one of $Al_2O_3$, HfOx, $TiO_2$, $SO_2$, and ZnO.

Figure 3D:
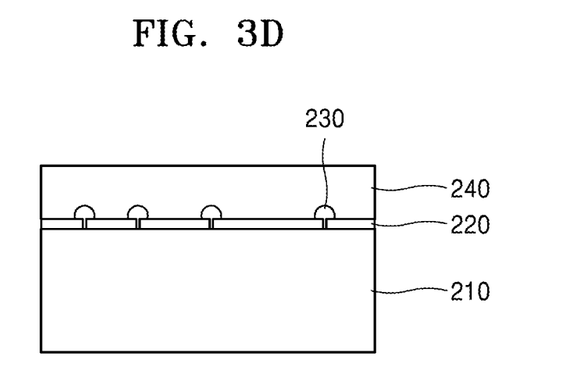

Fourth, referring to FIG. 3D, a cover film 240 is attached on the graphene layer 220 and the oxide layer 230. The cover film 240 may protect the graphene layer 220 from external materials. Also, even when the cover film 240 is not attached, the oxide layer 230 on the graphene layer 220 may protect the graphene layer 220.

Figure 3E:
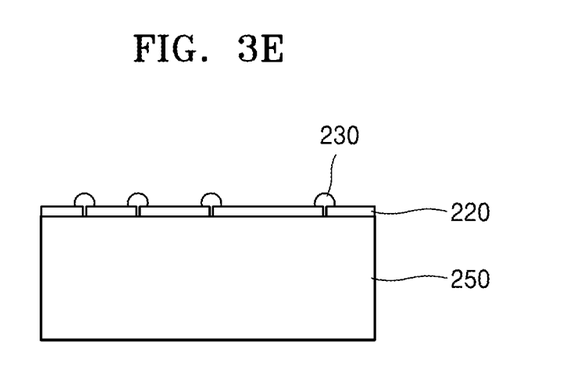

Fifth, referring to FIG. 3E, the catalyst layer 210 is removed, and the graphene layer 220 and the oxide layer 230 are transferred onto a substrate 250. The catalyst layer 210 may be removed by, for example, wet etching. However, a method of removing the catalyst layer 210 is not limited thereto. A dry etching process, for example, etching or polishing a surface of the catalyst layer 210 by using plasma, may be additionally performed before performing the wet etching process, thereby decreasing time necessary for removing the catalyst layer 210. Examples of an etchant that is used to wet-etch the catalyst layer 210 may include one of $(NH_4)_2S_2O_8$, HF, BOE, $FeCl_3$, $Fe(No_3)_3$, $CuCl_2$, $H_2O_2$, $H_2SO_4$, and sodium persulfate $Na_2S_2O_8$. However, the examples of the etchant are not limited thereto. Alternatively, a hydrogen peroxide-based solution consisting of $H_2O_2$, $H_2SO_4$, and $H_2O$ may be used. After the catalyst layer 210 is removed, a process of cleaning and drying of the remaining etchant may be further included.

After the catalyst layer 210 is removed, the graphene layer 220 and the oxide layer 230 formed on the defect site D of the graphene layer 220 may be transferred onto the substrate 250, and the cover film 240 may be removed. The substrate 250 indicates a component on which the graphene nano-mesh 225 is to be formed. The substrate 250 may be a flexible substrate that includes a flexible material, for example, a polymer. For example, the substrate 250 may include, but is not limited to, PEN, PET, polycarbonate, polyvinyl alcohol, polyacrylate, polyimide, polynorbornene, or PES.

When the cover film 240 is a thermal release tape, heat caused by a thermal release temperature or above may be applied to the thermal release tape to reduce adhesion strength of the thermal release tape. Then, a desired, or alternatively predetermined amount of force may be applied to separate the cover film 240 from the graphene layer 220 and the oxide layer 230. When the cover film 240 is a polymer supporter, an organic solvent such as acetone may be applied to melt and remove the cover film 240.

Figure 3F:
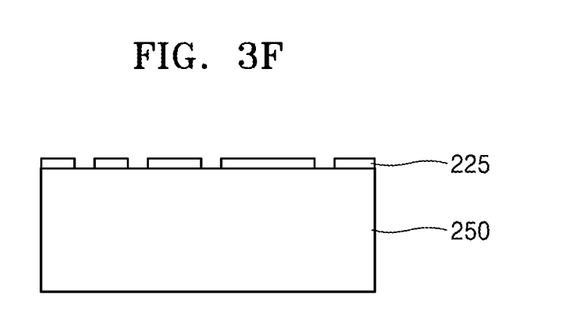

Fifth, referring to FIG. 3F, the oxide layer 230 of FIG. 3E is removed by etching When the oxide layer 230 is removed, a portion of the graphene layer 220 corresponding to the defect site D to which the oxide layer 230 is adsorbed may also be removed. Accordingly, the graphene nano-mesh 225 with a plurality of holes may be formed.

Since the graphene nano-mesh 225 is formed by partially removing graphene from the graphene layer 220, the graphene nano-mesh 225 may have lower electricity conductivity than the graphene layer 220. That is, a surface resistance of the graphene nano-mesh 225 may be greater than the surface resistance of the graphene layer 220. The graphene nano-mesh 225 may be doped to decrease the surface resistance thereof. Doping may be performed by dry doping or wet doping. Accordingly, electric characteristics of the graphene nano-mesh 225 may be improved.

Figure 4:
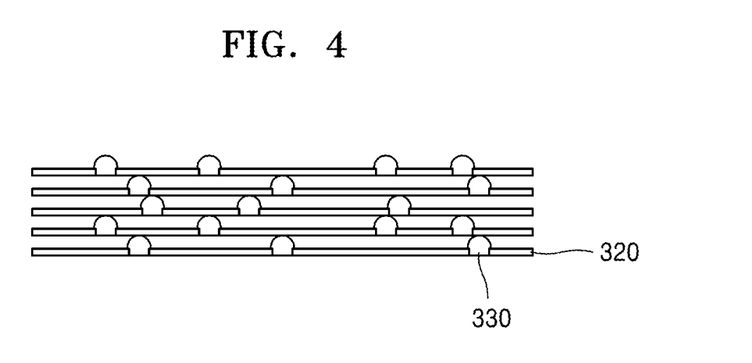
FIG. 4 is a cross-sectional view schematically illustrating a super capacitor formed according to another example embodiment.

FIG. 4 is a cross-sectional view schematically illustrating a super capacitor formed according to another example embodiment.

Referring to FIG. 4, a plurality of graphene layers 320 and a plurality of oxide layers 330 are stacked and transferred onto a substrate. That is, the oxide layer 330 is not removed by etching, but the graphene layer 320 and the oxide layer 330 are stacked a plurality of times. The oxide layer 330 that is selectively grown on the graphene layer 320 may protect the graphene layer 320 from being damaged while the graphene layer 320 is being transferred. Since an effective area for storing electricity increases in the stacked graphene layers 320, the stacked graphene layers 320 may be used as a super capacitor.

Based on the above-described example method of fabricating the graphene nano-mesh, the fabricating steps and time may be reduced because there is no additional photolithography process. Also, since no polymer is used as photoresist, the graphene nano-mesh may be formed while maintaining a clean surface of graphene.

It should be understood that example embodiments described herein should be considered in a descriptive sense only and not for purposes of limitation. Descriptions of features within each example embodiment should typically be considered as available for other similar or same features in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A method of fabricating a graphene nano-mesh, the method comprising:
   forming a graphene layer on a catalyst layer;
   forming an oxide layer on at least one defect site of the graphene layer;
   forming a graphene nano-mesh including a plurality of openings by etching the oxide layer; and
   transferring, after removing the catalyst layer, the graphene nano-mesh onto a substrate.

2. The method of claim 1, further comprising, after forming the graphene nano-mesh including the plurality of openings, forming a cover film on the graphene nano-mesh.

3. The method of claim 1, wherein the forming of the graphene layer comprises forming the graphene layer via chemical vapor deposition.

4. The method of claim 3, wherein the chemical vapor deposition includes plasma enhanced chemical vapor deposition.

5. The method of claim 1, wherein the forming of the oxide layer comprises forming the oxide layer via atomic layer deposition.

6. The method of claim 1, wherein the oxide layer comprises at least one of $Al_2O_3$, $HfO_x$, $TiO_2$, $SiO_2$, and ZnO.

7. The method of claim 1, further comprising, after forming the graphene nano-mesh including the plurality of openings, chemically doping the graphene nano-mesh.

8. The method of claim 1, wherein the substrate is a flexible transparent substrate.

9. The method of claim 1, wherein the transferring of the graphene nano-mesh onto the substrate comprises stacking a plurality of the graphene nano-mesh on the substrate.

10. A method of fabricating a graphene nano-mesh, the method comprising:
    forming a graphene layer on a catalyst layer;
    forming an oxide layer on at least one defect site of the graphene layer;
    removing the catalyst layer;
    transferring the graphene layer and the oxide layer onto a substrate; and
    forming a graphene nano-mesh including a plurality of openings by etching the oxide layer.

11. The method of claim 10, further comprising, after forming the oxide layer, forming a cover film on the graphene layer and the oxide layer.

12. The method of claim 10, wherein the forming of the graphene layer comprises forming the graphene layer via chemical vapor deposition.

13. The method of claim 12, wherein the chemical vapor deposition includes plasma enhanced chemical vapor deposition.

14. The method of claim 10, wherein the forming of the oxide layer comprises forming the oxide layer via atomic layer deposition.

15. The method of claim 10, wherein the oxide layer comprises at least one of $Al_2O_3$, $HfO_x$, $TiO_2$, $SiO_2$, and ZnO.

16. The method of claim 10, further comprising, after forming the graphene nano-mesh including the plurality of openings, chemically doping the graphene nano-mesh.

17. A method of fabricating a super capacitor, the method comprising:
    forming a graphene layer on a catalyst layer;
    forming an oxide layer on at least one defect site of the graphene layer;
    removing the catalyst layer; and
    transferring the graphene layer and the oxide layer onto a substrate by stacking a plurality of the graphene layer and the oxide layer on the substrate.

18. The method of claim 17, wherein the oxide layer comprises at least one of $Al_2O_3$, $HfO_x$, $TiO_2$, $SiO_2$, and ZnO.

* * * * *